(12) United States Patent
Ikemoto et al.

(10) Patent No.: US 12,500,464 B2
(45) Date of Patent: Dec. 16, 2025

(54) ROTOR

(71) Applicant: AISIN CORPORATION, Aichi (JP)

(72) Inventors: Masayuki Ikemoto, Kariya (JP); Takahiro Tsukamoto, Kariya (JP); Takahiro Odagi, Kariya (JP)

(73) Assignee: AISIN CORPORATION, Kariya (JP)

( * ) Notice: Subject to any disclaimer, the term of this patent is extended or adjusted under 35 U.S.C. 154(b) by 225 days.

(21) Appl. No.: 18/265,890

(22) PCT Filed: Feb. 25, 2022

(86) PCT No.: PCT/JP2022/007828
§ 371 (c)(1),
(2) Date: Jun. 7, 2023

(87) PCT Pub. No.: WO2022/202093
PCT Pub. Date: Sep. 29, 2022

(65) Prior Publication Data
US 2024/0039353 A1   Feb. 1, 2024

(30) Foreign Application Priority Data
Mar. 22, 2021   (JP) ................. 2021-047467

(51) Int. Cl.
*H02K 1/32* (2006.01)
*H02K 1/276* (2022.01)
*H02K 9/19* (2006.01)

(52) U.S. Cl.
CPC .............. *H02K 1/32* (2013.01); *H02K 1/276* (2013.01); *H02K 9/19* (2013.01)

(58) Field of Classification Search
CPC . H02K 1/276; H02K 1/32; H02K 9/19; Y02T 10/64
USPC ............................................................ 310/54
See application file for complete search history.

(56) References Cited

U.S. PATENT DOCUMENTS

| | | | | |
|---|---|---|---|---|
| 8,896,167 B2* | 11/2014 | McKinzie | ................ | H02K 9/00 310/60 A |
| 8,928,195 B2* | 1/2015 | Ohashi | ..................... | H02K 9/19 310/58 |
| 9,154,006 B2* | 10/2015 | Yamamoto | ........... | H02K 1/2766 |
| 9,712,021 B2* | 7/2017 | Watanabe | ................ | H02K 3/04 |
| 9,806,572 B2* | 10/2017 | Yamagishi | ............... | H02K 9/19 |
| 10,084,359 B2* | 9/2018 | Kiyokami | ............ | H02K 1/2706 |
| 10,396,628 B2* | 8/2019 | Gi | .......................... | H02K 7/003 |

(Continued)

FOREIGN PATENT DOCUMENTS

| | | |
|---|---|---|
| JP | 2014-060857 A | 4/2014 |
| JP | 2016-146704 A | 8/2016 |

(Continued)

OTHER PUBLICATIONS

May 23, 2024 extended Search Report issued in European Patent Application No. 22774891.0.

(Continued)

*Primary Examiner* — Alex W Mok
(74) *Attorney, Agent, or Firm* — Oliff PLC

(57) ABSTRACT

A rotor and a shaft hole is located at a position in a rotor shaft within a range in an axial direction in which a rotor core is located, and a weir portion, the shaft hole, and a cooling medium discharge hole are located in this order from one side in the axial direction.

4 Claims, 3 Drawing Sheets

(56) References Cited

U.S. PATENT DOCUMENTS

| | | | | |
|---|---|---|---|---|
| 2010/0045125 | A1* | 2/2010 | Takenaka | H02K 9/19 |
| | | | | 310/54 |
| 2012/0299404 | A1* | 11/2012 | Yamamoto | H02K 1/28 |
| | | | | 310/61 |
| 2013/0038151 | A1* | 2/2013 | Ohashi | H02K 7/086 |
| | | | | 310/59 |
| 2013/0221772 | A1* | 8/2013 | Miyamoto | H02K 9/19 |
| | | | | 310/54 |
| 2013/0278091 | A1* | 10/2013 | Ohashi | H02K 9/197 |
| | | | | 310/58 |
| 2014/0077631 | A1 | 3/2014 | Watanabe et al. | |
| 2016/0233744 | A1 | 8/2016 | Kaneshige et al. | |
| 2017/0012503 | A1 | 1/2017 | Okochi | |
| 2020/0244123 | A1* | 7/2020 | Kang | H02K 9/19 |
| 2020/0244124 | A1 | 7/2020 | Kang et al. | |

FOREIGN PATENT DOCUMENTS

| | | |
|---|---|---|
| JP | 2017-017956 A | 1/2017 |
| JP | 2019-097220 A | 6/2019 |

OTHER PUBLICATIONS

Apr. 5, 2022 International Search Report issued in International Patent Application No. PCT/JP2022/007828.

* cited by examiner

ROTOR

TECHNICAL FIELD

The present disclosure relates to rotors.

BACKGROUND ART

Conventionally, a rotor is known that includes a cooling medium supply pipe including a cooling medium discharge hole for discharging a cooling medium for cooling. Such a rotor is disclosed in, for example, Japanese Unexamined Patent Application Publication No. 2016-146704 (JP 2016-146704 A).

The rotor disclosed in JP 2016-146704 A includes a rotor core and a rotor shaft fitted in the rotor core. The rotor further includes a cooling medium supply shaft (cooling medium supply pipe) extending in the axial direction of the rotor through a hollow portion inside the rotor shaft. The cooling medium supply shaft discharges a liquid cooling medium (cooling medium for cooling) from cooling medium discharge ports (cooling medium discharge holes) of the cooling medium supply shaft into the inside of the rotor shaft. The liquid cooling medium discharged into the inside of the rotor shaft enters cooling medium inlets of the rotor shaft due to the centrifugal force generated during rotation of the rotor. The liquid cooling medium having entered the cooling medium inlets of the rotor shaft is introduced into cooling channels inside the rotor core.

RELATED ART DOCUMENTS

Patent Documents

Patent Document 1: Japanese Unexamined Patent Application Publication No. 2016-146704 (JP 2016-146704 A)

SUMMARY OF THE DISCLOSURE

Problem to be Solved by the Disclosure

In the rotor described in JP 2016-146704 A, there are cases where part of the liquid cooling medium (cooling medium for cooling) discharged from the cooling medium discharge ports (cooling medium discharge holes) flows toward the opposite side of the cooling medium inlets of the rotor shaft from the cooling medium discharge ports without entering the cooling medium inlets. In this case, the efficiency in cooling the rotor core may be reduced because the liquid cooling medium that does not enter the cooling medium inlets of the rotor shaft will not be introduced into the inside of the rotor core. Therefore, in order to improve the efficiency in cooling a rotor core, a rotor is desired in which a cooling medium for cooling discharged from a cooling medium supply shaft (cooling medium supply pipe) into the inside of a rotor shaft can be efficiently caused to enter a cooling medium inlet (shaft hole) of the rotor shaft.

The present disclosure was made to solve the above problem, and it is one object of the present disclosure to provide a rotor in which a cooling medium for cooling discharged from a cooling medium supply pipe into the inside of a rotor shaft can be efficiently caused to enter a shaft hole of the rotor shaft.

Means for Solving the Problem

In order to achieve the above object, a rotor according to one aspect of the present disclosure includes: a rotor core including a shaft insertion hole that extends in an axial direction and further including a first channel inside through which a cooling medium for cooling flows; a hollow rotor shaft inserted in the shaft insertion hole; and a cooling medium supply pipe inserted into the rotor shaft, including a second channel inside through which the cooling medium for cooling flows, and further including a cooling medium discharge hole from which the cooling medium for cooling is discharged. The rotor shaft includes: a shaft hole that introduces the cooling medium for cooling into the first channel of the rotor core by discharging the cooling medium for cooling to outside of the rotor shaft; and a weir portion that is provided so as to protrude from an inner peripheral surface of the rotor shaft and that stops the cooling medium for cooling moving in the axial direction between the inner peripheral surface of the rotor shaft and an outer peripheral surface of the cooling medium supply pipe. The shaft hole is located at a position in the rotor shaft within a range in the axial direction in which the rotor core is located. The weir portion, the shaft hole, and the cooling medium discharge hole are located in this order from one side in the axial direction.

In the rotor according to the one aspect of the present disclosure, the weir portion, the shaft hole, and the cooling medium discharge hole are located in this order from the one side in the axial direction, as described above. Accordingly, when the cooling medium for cooling is discharged from the cooling medium discharge hole, part of the discharged cooling medium that flows toward the weir portion without entering the shaft hole can be stopped and returned back toward the shaft hole by the weir portion. As a result, the cooling medium for cooling discharged from the cooling medium supply pipe into the inside of the rotor shaft can be efficiently caused to enter the shaft hole of the rotor shaft compared to the case where the weir portion is not provided.

Since the shaft hole is located at a position in the rotor shaft within the axial range in which the rotor core is located, the distance between the shaft hole and the first channel provided inside the rotor core can be easily reduced compared to the case where the shaft hole is provided outside this range. The cooling medium for cooling can thus be efficiently introduced into the first channel through the shaft hole. Since the weir portion, the shaft hole, and the cooling medium discharge hole are located in this order as described above, the cooling medium for cooling is efficiently caused to enter the shaft hole of the rotor shaft. The cooling medium for cooling can therefore be more efficiently introduced into the first channel. As a result, the rotor core can be more efficiently cooled by the cooling medium for cooling.

Effects of the Disclosure

According to the present disclosure, the cooling medium for cooling discharged from the cooling medium supply pipe into the inside of the rotor shaft can be efficiently caused to enter the shaft hole of the rotor shaft.

MODES FOR CARRYING OUT THE DISCLOSURE

Figure 1:
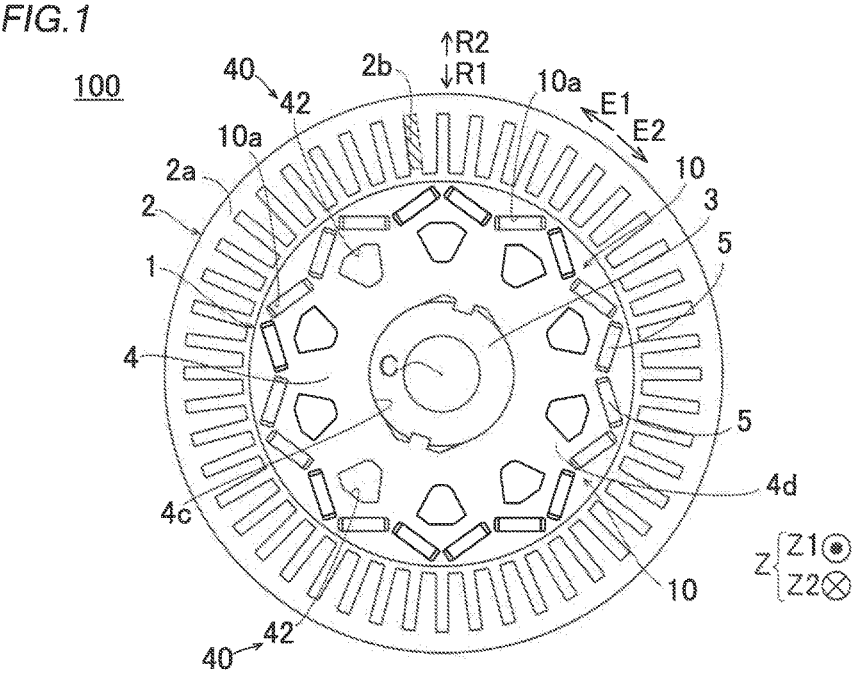
FIG. 1 is a plan view showing the configuration of a rotating electrical machine according to an embodiment.

Hereinafter, an embodiment of the present disclosure will be described with reference to the drawings.

A rotor 1 according to the embodiment will be described with reference to FIGS. 1 to 4.

In the present specification, the "axial direction" means a direction along a rotation axis C of the rotor 1 and means the Z direction in the drawings. The "radial direction" means the radial direction of the rotor 1 (R1 direction or R2 direction), and the "circumferential direction" means the circumferential direction of the rotor 1 (E1 direction or E2 direction).

As shown in FIG. 1, the rotor 1 together with a stator 2 forms a rotating electrical machine 100. The rotor 1 and the stator 2 are each formed in an annular shape. The rotor 1 is disposed so as to face the radially inner side of the stator 2. That is, in the present embodiment, the rotating electrical machine 100 is configured as an inner rotor type rotating electrical machine. The rotor 1 includes a rotor shaft 3. The rotor shaft 3 is disposed radially inside the rotor 1 (rotor core 4 described later). The rotor shaft 3 is connected to an engine, an axle, etc. via a rotational force transmission member such as a gear. For example, the rotating electrical machine 100 is configured as a motor, a generator, or a motor generator, and is configured to be mounted on a vehicle.

The rotor 1 further includes the rotor core 4. The rotor core 4 is composed of a stack of a plurality of electrical steel sheets 4a (see FIG. 3), and has a magnet insertion hole 10a extending in the stacking direction of the electrical steel sheets 4a (Z direction). The rotor 1 (rotor core 4) further includes a permanent magnet 5. The permanent magnet 5 is inserted (placed) in the magnet insertion hole 10a of the rotor core 4.

The rotor core 4 has a plurality (20 in the present embodiment) of the magnet insertion holes 10a. That is, the rotating electrical machine 100 is configured as an interior permanent magnet motor (IPM motor).

The rotor core 4 includes a plurality of magnetic pole forming portions 10 forming magnetic poles and each including a pair of magnet insertion holes 10a adjacent to each other in the circumferential direction. Ten magnetic pole forming portions 10 are provided at equal angular intervals in the circumferential direction in the rotor core 4 as viewed in the direction of the rotation axis C. The pair of magnet insertion holes 10a in the magnetic pole forming portion 10 is arranged in a V-shape pointing radially inward (toward the R1 side).

As shown in FIG. 1, the rotor core 4 is rotated about the rotation axis C. The rotor core 4 further has a shaft insertion hole 4c extending in the axial direction. The shaft insertion hole 4c is provided in the central portion of the rotor core 4 as viewed in the axial direction of the rotor core 4 (as viewed in the Z1 direction). The rotor shaft 3 is inserted into the shaft insertion hole 4c. When the rotor shaft 3 is rotated, the rotational force of the rotor shaft 3 is transmitted to the rotor core 4, so that the rotor core 4 is rotated.

Figure 2:
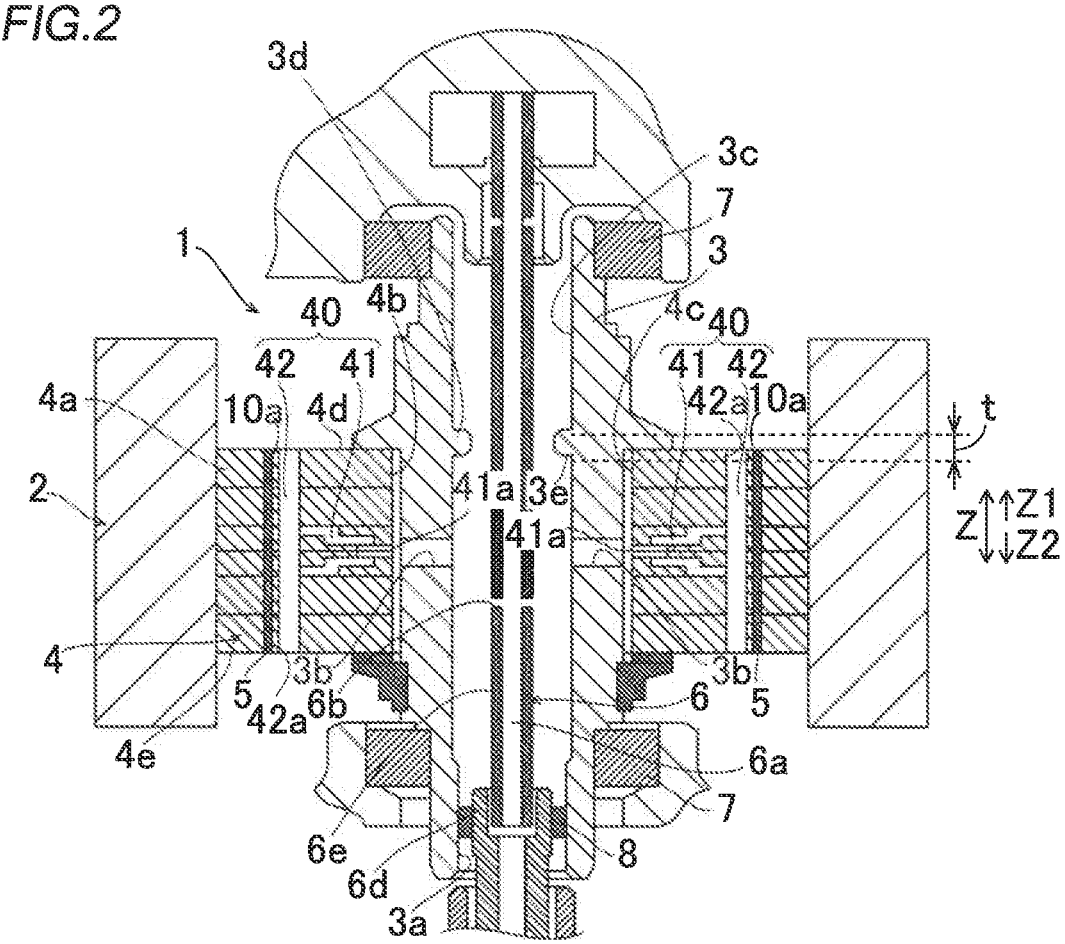
FIG. 2 is a sectional view of the rotating electrical machine according to the embodiment taken along an axial direction.

As shown in FIG. 2, the rotor 1 further includes a shaft bearing portion 7 that supports rotation of the rotor shaft 3. The shaft bearing portion 7 is provided near both axial ends of the rotor shaft 3.

The rotor core 4 further includes a cooling channel 40 inside through which cooling oil 90 flows. The rotor core 4 includes a plurality (10 in the present embodiment) of the cooling channels 40. The cooling channel 40 includes a radial channel 41 (see FIG. 2) extending in the radial direction, and an axial channel 42 connected to the radial channel 41 and extending in the direction. The cooling oil 90 sequentially flows through an oil shaft 6 described later, the rotor shaft 3, the radial channel 41, and the axial channel 42 in this order, and is discharged to the outside of the rotor core 4 through openings 42a of the axial channel 42 that are provided in each of an end face 4d on one side in the axial direction (Z1 side) and an end face 4e on the other side in the axial direction (Z2 side) of the rotor core 4. The cooling oil 90 flowing through the cooling channel 40 cools the permanent magnets 5 (rotor core 4) by the heat transfer effect via the electrical steel sheets 4a. The cooling channel 40 is provided between adjacent ones of the magnetic pole forming portions 10 in the circumferential direction. The axial channel 42 is located radially inward of the magnetic pole forming portions 10. The cooling channel 40 is an example of the "first channel" in the claims.

The radial channel 41 is formed in a stepped shape. Therefore, the amount of material that is removed from each electrical steel sheet 4a can be reduced compared to the case where the radial channel 41 is not formed in a stepped shape (linearly extends in the radial direction). As a result, a portion connecting the portion radially outward of the portion where the material has been removed and the portion radially inward of the portion where the material has been removed is reduced in size in the electrical steel sheets 4a. This can prevent stress concentration due to the centrifugal force of the rotor 1 itself during rotation of the rotor 1. The radial channel 41 is bifurcated from the radially inner side toward the radially outer side. The radial channel 41 is provided in the middle portion in the axial direction of the rotor core 4.

As shown in FIG. 1, the stator 2 includes a stator core 2a and a coil 2b wound around (placed in) the stator core 2a. The stator core 2a is located radially outside the rotor core 4. The stator core 2a is composed of, for example, a plurality of electrical steel sheets (silicon steel sheets) stacked in the axial direction, and is configured to allow magnetic flux to pass therethrough. The coil 2b is connected to an external power supply unit, and is configured to be supplied with electric power (e.g. three-phase alternating current power). The coil 2b is configured to generate a magnetic field when supplied with electric power. The rotor 1 and the rotor shaft 3 are configured to rotate with respect to the stator 2 as the engine etc. is driven, even when no electric power is supplied to the coil 2b. Although only part of the coil 2b is shown in FIG. 1, the coil 2b is disposed along the entire circumference of the stator core 2a.

The permanent magnet 5 is rectangular in cross section orthogonal to the axial direction. For example, the permanent magnet 5 is configured so that its magnetization direction (magnetized direction) is the lateral direction of the permanent magnet 5. A resin material, not shown, for fixing the permanent magnet 5 placed in the magnet insertion hole 10a is placed in the magnet insertion hole 10a.

As shown in FIG. 2, the rotor shaft 3 is formed in a cylindrical shape. That is, the rotor shaft 3 has a hollow structure.

The rotor 1 further includes the oil shaft 6 inserted into the rotor shaft 3. The oil shaft 6 is inserted into the rotor shaft 3 through an insertion hole 3a of the rotor shaft 3. The oil shaft 6 includes an oil channel 6a inside through which the cooling oil 90 flows. The oil shaft 6 also includes a discharge hole 6b through which the cooling oil 90 is discharged. That is, the cooling oil 90 flowing through the oil channel 6a is discharged from the discharge hole 6b. The discharge hole 6b is provided at a predetermined position in the axial direction of the oil shaft 6. The oil shaft 6 and the cooling oil 90 are examples of the "cooling medium supply pipe" and the "cooling medium for cooling" in the claims, respectively. The oil channel 6a and the discharge hole 6b are examples of the "second channel" and the "cooling medium discharge hole" in the claims, respectively.

The oil shaft 6 is attached to an oil pump, not shown. The oil pump is configured to send the cooling oil 9) to the oil channel 6a of the oil shaft 6. The end on the Z2 side of the oil shaft 6 is held by a holding portion 6d.

The rotor shaft 3 has a shaft hole 3b. One shaft hole 3b is provided for every two or more cooling channels 40. The shaft hole 3b introduces the cooling oil 90 into the cooling channels 40 (radial channels 41) of the rotor core 4 by discharging the cooling oil 90 to the outside of the rotor shaft 3. Specifically, the shaft hole 3b is provided so as to face the radial channels 41 in the radial direction. More specifically, the shaft hole 3b is provided so as to face introducing ports 41a of the radial channels 41 that are provided in a core inner peripheral surface 4b that is the inner peripheral surface of the rotor core 4. The cooling oil 90 between a shaft inner peripheral surface 3c that is the inner peripheral surface of the rotor shaft 3 and an outer peripheral surface 6e of the oil shaft 6 is caused to enter the shaft hole 3b and is discharged from the shaft hole 3b to the outside of the rotor shaft 3 due to the centrifugal force generated during rotation of the rotor 1. The shaft inner peripheral surface 3c is an example of the "inner peripheral surface" in the claims.

Figure 3:
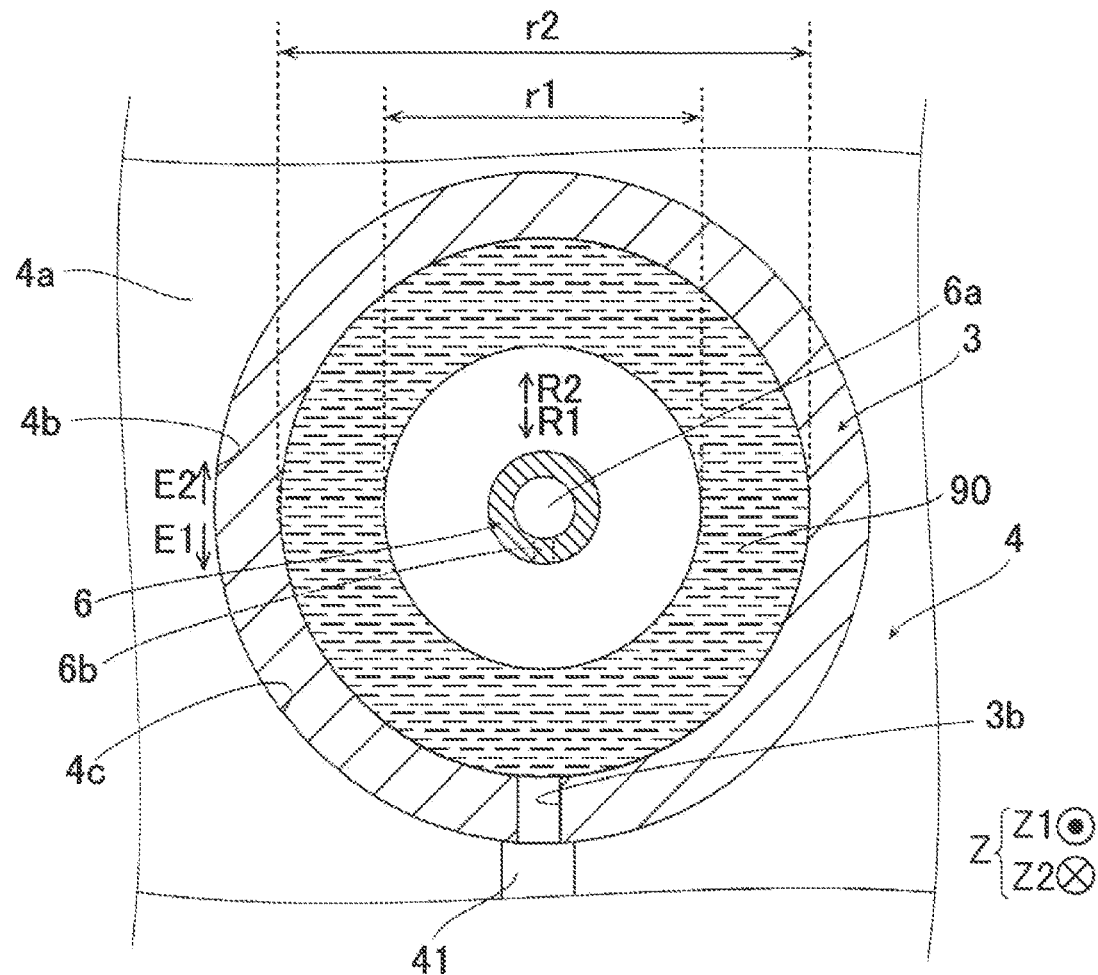
FIG. 3 is a planar sectional view of a rotor according to the embodiment.

As shown in FIG. 3, the pressure of the cooling oil 90 (centrifugal oil pressure P) generated by the centrifugal force during rotation of the rotor 1 is given by the following equation (1), where ρ is the density of the cooling oil 90, r1 is the oil level inside diameter of the cooling oil 90, r2 is the inside diameter of the rotor shaft 3, and ω is the angular velocity of the rotor 1. In FIG. 3, only one shaft hole 3b (radial channel 41) is shown for simplicity. However, the number of shaft holes 3b (radial channels 41) is actually the same (i.e., 10) as that of magnetic pole forming portions 10.

[Equation 1]

$$P = \frac{\rho \omega^2 r2^2}{(r2-r1)^4}\left\{\frac{1}{4}(r2^4 - r1^4) - \frac{3}{4}r1(r2^3 - r1^3) + 3r1^2(r2^2 - r1^2) - 4r1^3(r2-r1) + r1^4 \log\frac{r2}{r1}\right\} \quad (1)$$

Figure 4:
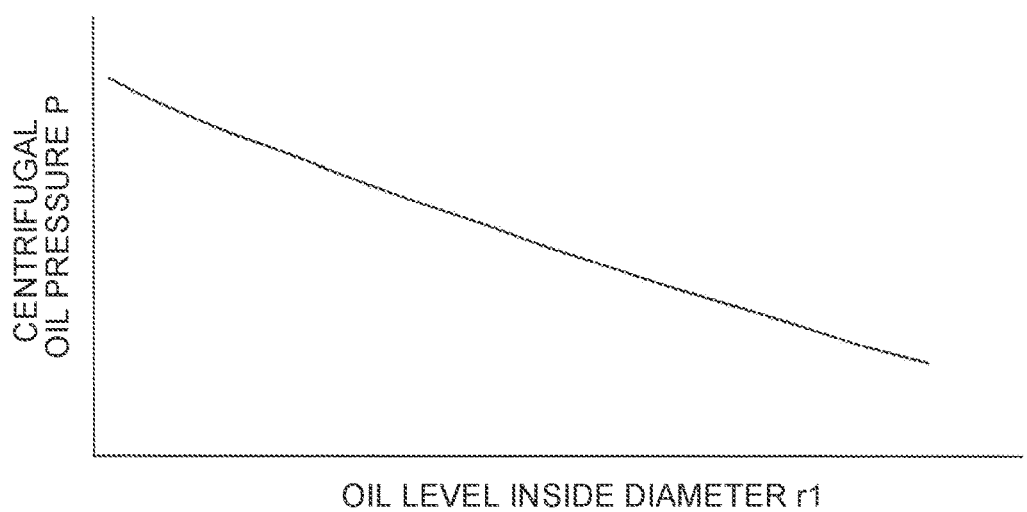
FIG. 4 is a diagram showing the relationship between the oil level inside diameter and the centrifugal oil pressure according to the embodiment.

Based on the above equation (1), as shown in FIG. 4, the smaller the oil level inside diameter r1, the higher the centrifugal oil pressure P. That is, the greater the oil level height of the cooling oil 90 ((r2−r1)/2), the higher the centrifugal oil pressure P. Based on the following equation (2), the larger the amount of change (ΔP) in centrifugal oil pressure P, the higher the flow rate (Q) of the cooling oil 90 flowing out through the shaft hole 3b. In the equation (2), α and A are the flow coefficient (determined by analysis results) and the cross-sectional area of the shaft hole 3b, respectively.

[Equation 2]

$$Q = \alpha A \sqrt{\frac{2\Delta P}{\rho}} \quad (2)$$

As shown in FIG. 2, the rotor shaft 3 includes a weir portion 3d provided so as to protrude from the shaft inner peripheral surface 3c of the rotor shaft 3. The weir portion 3d is provided to stop the cooling oil 90 moving in the axial direction between the shaft inner peripheral surface 3c and the outer peripheral surface 6e of the oil shaft 6. Specifically, the weir portion 3d restricts the cooling oil 90 from moving to the opposite side (Z1 side) of the weir portion 3d. The weir portion 3d is provided in the circumferential direction (annular shape) along the shaft inner peripheral surface 3c of the rotor shaft 3.

The weir portion 3d is formed by forging. Specifically, the weir portion 3d is formed by drawing the radial inner portion of the rotor shaft 3 from both sides in the axial direction.

In the rotor 1, the shaft hole 3b is located at a position in the rotor shaft 3 within the axial range in which the rotor core 4 is located, and the weir portion 3d, the shaft hole 3b, and the discharge hole 6b are located in this order from the one side in the axial direction (Z1 side). In other words, the shaft hole 3b is located at a position between the position where the weir portion 3d is located and the position where the discharge hole 6b is located in the axial direction.

Accordingly, when the cooling oil 90 is discharged from the discharge hole 6b, part of the discharged cooling oil 90 that flows toward the weir portion 3d without entering the shaft hole 3b can be stopped and returned back toward the shaft hole 3b by the weir portion 3d. As a result, the cooling oil 90 discharged from the oil shaft 6 into the inside of the rotor shaft 3 can be efficiently caused to enter the shaft hole 3b of the rotor shaft 3 compared to the case where the weir portion 3d is not provided.

Since the shaft hole 3b is located at a position in the rotor shaft 3 within the axial range in which the rotor core 4 is located, the distance between the shaft hole 3b and the cooling channels 40 provided inside the rotor core 4 can be easily reduced compared to the case where the shaft hole 3b is provided outside this range. The cooling oil 90 can thus be efficiently introduced into the cooling channels 40 through the shaft hole 3b. Since the weir portion 3d, the shaft hole 3b, and the discharge hole 6b are located in this order as described above, the cooling oil 90 is efficiently caused to enter the shaft hole 3b of the rotor shaft 3. The cooling oil 90 can therefore be more efficiently introduced into the cooling channels 40. As a result, the permanent magnets 5 (rotor core 4) can be more efficiently cooled by the cooling oil 90.

Since the shaft hole 3b is located between the weir portion 3d and the discharge hole 6b in the axial direction, the amount of cooling oil 90 that reaches the weir portion 3d can be reduced compared to the case where the shaft hole 3b is not located between the weir portion 3d and the discharge hole 6b. As a result, the cooling oil 90 can be restrained from flowing over the weir portion 3d, so that a larger amount of cooling oil 90 can be caused to enter the shaft hole 3b.

The weir portion 3d is located at an axial position near the position where the end face 4d on the one side in the axial direction (Z1 side) of the rotor core 4 is located. "Near the position where the end face 4d is located" includes both an axial position overlapping the position where the end face 4d is located and an axial position around the position where the end face 4d is located.

Accordingly, the amount of overlap between the axial range in which the cooling oil 90 is stored inside the rotor shaft 3 (axial range between the discharge hole 6b and the weir portion 3d) and the axial range in which the rotor core 4 is located can be increased compared to the case where the weir portion 3d is provided away from near the axial position of the end face 4d of the rotor core 4 toward the other side in the axial direction (Z2 side). As a result, the permanent magnets 5 (rotor core 4) can be more efficiently cooled by the cooling oil 90 via the rotor shaft 3.

Moreover, the axial range in which the cooling oil 90 is stored inside the rotor shaft 3 (axial range between the discharge hole 6b and the weir portion 3d) can be reduced compared to the case where the weir portion 3d is provided away from near the axial position of the end face 4d of the rotor core 4 toward the one side in the axial direction (Z1 side). As a result, the oil level height of the cooling oil 90 in the rotor shaft 3 ((r2−r1)/2) can be increased. The oil pressure (centrifugal oil pressure P) of the cooling oil 90 introduced into the shaft hole 3b increases as the oil level height increases. Therefore, this oil pressure can be increased. As a result, the cooling oil 90 can be more efficiently introduced into the shaft hole 3b, so that the cooling oil 90 can be even more efficiently introduced into the cooling channels 40 of the rotor core 4. Since the amount of cooling oil 90 stored in the rotor shaft 3 can be made relatively small, an increase in inertia (moment of inertia) during rotation of the rotor 1 can be prevented.

The weir portion 3d has a predetermined thickness t in the axial direction. The end face 4d of the rotor core 4 is located at an axial position within the axial range in which the weir portion 3d is located. Specifically, the end face 4d of the rotor core 4 is located at an axial position between an end 3e on the other side in the axial direction (Z2 side) of the weir portion 3d and the middle of the weir portion 3d in the axial direction. In other words, the end face 4d of the rotor core 4 is located closer to the end 3e on the other side in the axial direction (Z2 side) of the weir portion 3d in the axial direction.

The weir portion 3d is located at an axial position near the middle portion of the rotor shaft 3 in the axial direction. "Near the middle portion" includes both the middle portion and around the middle portion. The lengths of the portions of the rotor shaft 3 that are located on the one side and the other side in the axial direction of the weir portion 3d can therefore be made relatively small. As a result, the stroke of a jig used for forging (distance by which the jig can be moved in the axial direction) can be made close to uniform on both sides in the axial direction.

The weir portion 3d is not provided on the other side in the axial direction (Z2 side) with respect to the discharge hole 6b of the oil shaft 6, and is located on the one side in the axial direction (Z1 side) with respect to the discharge hole 6b and the shaft hole 3b and is integral with the rotor shaft 3. Specifically, the weir portion 3d is a portion formed by deforming part of the rotor shaft 3 by forging.

The structure of the rotor shaft 3 can therefore be simplified compared to the case where the weir portion 3d is also provided on the other side in the axial direction (Z2 side) with respect to the discharge hole 6b of the oil shaft 6. Moreover, the manufacturing process of the rotor shaft 3 can be simplified in the case where the rotor shaft 3 is formed by forging etc.

Since the weir portion 3d is integral with the rotor shaft 3, the mechanical strength of the weir portion 3d can be improved and the number of parts can be reduced because a fastening member etc. for attachment is not required, compared to the case where the weir portion 3d is a separate member from the rotor shaft 3 (is attached to the rotor shaft 3).

The oil shaft 6 is configured to discharge the cooling oil 90 while rotating.

The rotor 1 includes an oil shaft bearing portion 8 located inside the rotor shaft 3 on the other side in the axial direction (Z2 side) on which the weir portion 3d is not provided with respect to the discharge hole 6b of the oil shaft 6. The oil shaft bearing portion 8 is provided to support rotation of the oil shaft 6 and to stop the cooling oil 90 moving toward the other side in the axial direction (Z2 side). Specifically, the oil shaft bearing portion 8 is provided so as to be sandwiched between the shaft inner peripheral surface 3c of the rotor shaft 3 and the holding portion 6d for the oil shaft 6. The oil shaft bearing portion 8 is an example of the "bearing portion" in the claims.

The cooling oil 90 moving toward the other side in the axial direction (Z2 side) can thus be stopped by the oil shaft bearing portion 8 without providing the weir portion 3d on the other side in the axial direction with respect to the discharge hole 6b of the oil shaft 6. As a result, the cooling oil 90 moving toward the other side in the axial direction can be stopped while simplifying the structure of the rotor shaft 3.

The rotor core 4 is located on the one side in the axial direction with respect to the oil shaft bearing portion 8.

The discharge hole 6b of the oil shaft 6 is located at an axial position within the axial range in which the rotor core 4 is located.

The distance between the discharge hole 6b of the oil shaft 6 and the oil shaft bearing portion 8 can thus be increased compared to the case where the discharge hole 6b is provided at an axial position located outside the axial range in which the rotor core 4 is located and on the other side in the axial direction (Z2 side). As a result, the amount of cooling oil 90 flowing to the oil shaft bearing portion 8 can be reduced, so that drag (loss due to heat generated by friction) in the oil shaft bearing portion 8 can be prevented.

Modifications

The embodiment disclosed herein should be construed as illustrative in all respects and not restrictive. The scope of the present disclosure is shown by the claims rather than by the above description of the embodiment, and includes all changes (modifications) that fall within the meaning and scope equivalent to the claims.

For example, the above embodiment illustrates an example in which the end face 4d of the rotor core 4 is located at an axial position within the axial range in which the weir portion 3d is located. However, the present disclosure is not limited to this. The end face 4d of the rotor core 4 may be located at an axial position outside the axial range in which the weir portion 3d is located.

The above embodiment illustrates an example in which the weir portion 3d is located at an axial position near the position where the end face 4d of the rotor core 4 is located. However, the present disclosure is not limited to this. The weir portion 3d may be located at an axial position other than near the position where the end face 4d of the rotor core 4 is located.

The above embodiment illustrates an example in which the weir portion 3d is not provided on the other side in the axial direction with respect to the discharge hole 6b (cooling medium discharge hole) of the oil shaft 6 (cooling medium supply pipe). However, the present disclosure is not limited to this. The weir portion 3d may also be provided on the other side in the axial direction with respect to the discharge hole 6b of the oil shaft 6.

The above embodiment illustrates an example in which the weir portion 3d is integral with the rotor shaft 3. However, the present disclosure is not limited to this. The weir portion 3d may be a separate member from the rotor shaft 3. That is, the weir portion 3d may be attached to the rotor shaft 3 (by, e.g., a fastening member or adhesion).

The above embodiment illustrates an example in which the discharge hole 6b (cooling medium discharge hole) of the oil shaft 6 (cooling medium supply pipe) is located at an axial position within the axial range in which the rotor core 4 is located. However, the present disclosure is not limited to this. The discharge hole 6b of the oil shaft 6 may be located at an axial position outside the axial range in which the rotor core 4 is located (on the other side in the axial direction, the Z2 side).

The above embodiment illustrates an example in which the weir portion 3d is formed by forging. However, the present disclosure is not limited to this. The weir portion 3d may be formed by a method other than forging (e.g., plug forming in which a metal die is brought into close contact with a material to perform forming).

The above embodiment illustrates an example in which the rotor 1 is cooled by the cooling oil 90 (cooling medium for cooling). However, the present disclosure is not limited to this. The rotor 1 may be cooled by a liquid cooling medium other than the cooling oil 90 (e.g., a coolant).

It should be understood by those skilled in the art that the illustrative embodiment described above is a specific example of the following aspect.

The weir portion (3d) has a predetermined thickness (t) in the axial direction. The end face (4d) of the rotor core (4) is located at an axial position within the axial range in which the weir portion (3d) is located (within the range of the thickness t of the weir portion 3d).

DESCRIPTION OF THE REFERENCE NUMERALS

1 . . . rotor, 3 . . . rotor shaft, 3b . . . shaft hole, 3c . . . shaft inner peripheral surface (inner peripheral surface), 3d . . . weir portion, 4 . . . rotor core, 4c . . . shaft insertion hole, 4d . . . end face, 6 . . . oil shaft (cooling medium supply pipe), 6a . . . oil channel (first channel), 6b . . . discharge hole (cooling medium discharge hole), 6e . . . outer peripheral surface, 8 . . . oil shaft bearing portion (bearing portion), 40 . . . cooling channel (first channel). 90 . . . cooling oil (cooling medium for cooling)

The invention claimed is:

1. A rotor comprising:
a rotor core including a shaft insertion hole that extends in an axial direction and further including a first channel inside through which a cooling medium for cooling flows;
a hollow rotor shaft inserted in the shaft insertion hole; and
a cooling medium supply pipe inserted into the rotor shaft, including a second channel inside through which the cooling medium for cooling flows, and further including a cooling medium discharge hole from which the cooling medium for cooling is discharged, wherein
the rotor shaft includes: a shaft hole that introduces the cooling medium for cooling into the first channel of the rotor core by discharging the cooling medium for cooling to outside of the rotor shaft; and a weir portion that is provided so as to protrude from an inner peripheral surface of the rotor shaft and that stops the cooling medium for cooling moving in the axial direction between the inner peripheral surface of the rotor shaft and an outer peripheral surface of the cooling medium supply pipe,
the shaft hole is located at a position in the rotor shaft within a range in the axial direction in which the rotor core is located, and the weir portion, the shaft hole, and the cooling medium discharge hole are located in this order from one side in the axial direction, and
the weir portion is located at a position in the axial direction overlapping a position where an end face on the one side in the axial direction of the rotor core is located.

2. The rotor according to claim 1, wherein the weir portion is not provided on the other side in the axial direction with respect to the cooling medium discharge hole of the cooling medium supply pipe, and is located on the one side in the axial direction with respect to the cooling medium discharge hole and the shaft hole and is integral with the rotor shaft.

3. The rotor according to claim 2, wherein
the cooling medium supply pipe is configured to discharge the cooling medium for cooling while rotating, the rotor further comprising:
a bearing portion that is located inside the rotor shaft on the other side in the axial direction on which the weir portion is not provided with respect to the cooling medium discharge hole of the cooling medium supply pipe, the bearing portion being provided to support rotation of the cooling medium supply pipe and to stop the cooling medium for cooling moving toward the other side in the axial direction.

4. The rotor according to claim 3, wherein
the rotor core is located on the one side in the axial direction with respect to the bearing portion, and
the cooling medium discharge hole of the cooling medium supply pipe is located at a position in the axial direction within the range in the axial direction in which the rotor core is located.

* * * * *